United States Patent
Mercade

[15] 3,656,895
[45] Apr. 18, 1972

[54] RECOVERY OF CALCIUM FLUORIDE FROM FLUORSPAR ORE
[72] Inventor: Venacio V. Mercade, Metuchen, N.J.
[73] Assignee: Engelhard Minerals & Chemicals Corporation, Township of Woodbridge, N.J.
[22] Filed: May 1, 1970
[21] Appl. No.: 33,868

[52] U.S. Cl. ................................23/88, 23/90, 23/134, 23/312, 75/1, 75/2, 75/7
[51] Int. Cl. .....................................C01f 11/22
[58] Field of Search.................23/88, 90, 134; 75/1, 2, 6, 75/7, 67, 111

[56] References Cited

UNITED STATES PATENTS

| 3,005,685 | 10/1961 | Riedl et al. | 23/88 |
| 292,742 | 7/1943 | Beck | 23/1 D |
| 3,305,345 | 2/1967 | Rausch et al. | 75/1 |
| 3,414,402 | 12/1968 | Volk et al. | 75/1 X |
| 2,985,508 | 5/1961 | Fredrickson et al. | 23/90 X |
| 2,111,236 | 3/1938 | Ball | 23/90 |

FOREIGN PATENTS OR APPLICATIONS

| 208,705 | 1/1968 | U.S.S.R. | 23/90 |
| 11,753 | 5/1901 | Great Britain | 23/88 |
| 138,486 | 2/1920 | Great Britain | 23/90 |

Primary Examiner—Edward Stern
Attorney—Melvin C. Flint and Inez L. Moselle

[57] ABSTRACT

Calcium fluoride is recovered from a finely mineralized fluorspar ore containing inclusions of barite within micron-size particles of fluorite. The ore is pugged and a fine-size fraction is recovered and roasted with a chloride salt, preferably calcium chloride, and carbon. The roasted product is lixiviated with water to remove the barium chloride reaction product and treated with hydrochloric acid to extract residual impurities. Alternatively, the roasted product is extracted directly with the acid. The acid-extracted product may be further purified by extraction with a hydrosulfurous compound.

5 Claims, No Drawings

RECOVERY OF CALCIUM FLUORIDE FROM FLUORSPAR ORE

BACKGROUND OF THE INVENTION

Fluorspar ores frequently contain appreciable quantities of barite (heavy spar) as an impurity. Calcium phosphate minerals, ferruginous matter and siliceous impurities (e.g., clay) may also be present. Generally, some concentration of the fluorite (calcium fluoride) from the barite is effected by hydraulic classification. Because barium sulfate is poorly soluble or essentially insoluble in common reagents, the barite cannot be extracted directly from the fluorite that is concentrated in fine-size fractions of the ore.

Flotation has been widely used to remove barite from fluorite in certain ores. A successful flotation concentration, however, requires the physical liberation of the mineral particles to be separated. Ores in which impurities are locked in individual fluorite grains cannot be effectively purified by flotation.

Some fluorspar deposits, exemplified by a large deposit in central Italy, are very finely mineralized. The micron-size fluorite particles in the ore are contaminated with inclusions of impurities, namely barite. Appreciable concentration of fluorite may be accomplished by hydrometallurgy but efforts to upgrade the calcium fluoride content of the fluorite-enriched concentrate of the finely mineralized ore have not been successful because of the presence of impurities as minute inclusions in the fluorite particles.

THE INVENTION

An object of the invention is to provide a method for concentrating fluorite in a finely mineralized ore containing barite gangue.

A specific object is to concentrate fluorite from barite in a mixture which does not respond to separation by flotation.

Another object is to provide a novel hydrometallurgical-pyrometallurgical technique for recovering fluorite from a finely mineralized ore.

I have found a simple, practical method for removing barite and other impurities from very finely mineralized fluorite ores of the type described.

Stated briefly, the ore, preferably a fine-size fraction of the ore, is roasted in the presence of a chloride salt, preferably calcium chloride, and carbon, thereby converting the barium values into barium chloride and sulfur values into acid-soluble form. The roasted product is extracted with hydrochloric acid solution, preferably after first leaching with water.

When the ore also contains ferruginous gangue, the roast may be deironed by magnetic purification prior to acid extraction and/or by means of a hydrosulfurous extraction after the extraction with hydrochloric acid. The hydrosulfurous reagent also removes residual phosphate values from the fluorite.

In a preferred embodiment of the invention, the ore is prepared by pugging it with water to promote the liberation of mineral values, blunging the pugged ore in water, fractionating the ore by hydraulic classification, recovering a fine-size fraction and drying the fine-size fraction. (All sizes in the micron-size range refer to values obtained by the Casagrande sedimentation method.)

DETAILED DESCRIPTION

After crushing, the ore is preferably mixed with water and pugged in a suitable pug mill.

The ore is then pulped with water to prepare it for hydraulic classification. A dispersing agent, e.g., a mixture of soda ash and a condensed phosphate salt such as tetrasodium pyrophosphate, is preferably incorporated with the pulp. In most cases, coarse ore particles should be removed from the pulp before carrying out a fractionation step to recover a fine size fraction containing micron-size particles. Removal of coarse particles may be accomplished by passing the pulp through a screen having openings of a suitable size, e.g., a 325 mesh Tyler screen. Barite normally concentrates in the plus 325 portion of the ore.

The pulp should be sufficiently dilute to permit fractionation at a cut-off point which results in concentration of fluorite in a fine-size fraction. A well-dispersed 20 percent solids pulp is generally suitable. A fine-size fraction, typically 100 percent minus 10 microns or finer, depending upon the particle size of the bulk of the fluorite particles, is recovered as an aqueous suspension. The fluorite concentrates in the fine-size fraction and barite concentrates in the coarse-size fraction.

After fractionation, the resulting low grade fluorite concentrate is dried and ground if necessary.

The low grade fluorite concentrate is mixed with a chloride salt and carbon (unless the ore contains a significant amount of organic impurity). The mixture, which may be pelletized if desired, is roasted at a temperature below the melting points of calcium fluoride and barium sulfate. Temperatures of 760° C. and 1,100° C. have been used successfully. The roasting should be carried out under reducing conditions. A closed or partially closed roaster is employed.

The principal reaction involved when roasting the ore with calcium chloride and carbon is believed to be in accordance with the following equation:

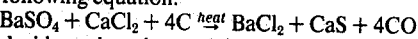

Using chlorides other than calcium chloride, corresponding sulfides are formed.

Chloride salts that may be used include monovalent and divalent chloride salts, exemplified by chloride salts of sodium, potassium, lithium, ammonium, calcium, magnesium, strontium and barium. The cation of the chloride must be one which forms an acid-soluble sulfide. Calcium chloride is presently preferred for the reason that the added calcium represses ionization of calcium fluoride and thereby minimizes losses of fluoride values during the subsequent acid extraction step. Sodium chloride or a mixture of sodium chloride and calcium fluoride may be preferred when the siliceous impurities are troublesome since the sodium chloride may render such impurities soluble in the extracting solution.

It will be noted that barium chloride is soluble in water and hydrochloric acid of suitable concentration. Thus, this reaction product may be removed by either reagent or a combination thereof. Calcium sulfide hydrolyzes in water and is soluble in hydrochloric acid before and after hydrolysis.

Optimum proportions of carbon and chloride may be determined by simple experimentation.

The chloride salts also supply chlorine which may attack clay matter and some ferruginous impurities.

Fine ore tends to form aggregates during roasting. It is preferably to pulverize the aggregates before treating the roasted product to purify the fluorite.

If magnetic iron forms during roasting, it may be removed by wet or dry magnetic separation methods. This is preferably done prior to leaching with acid. Wet-magnetic separation is preferable since barium chloride may be removed from the roasted ore when the ore is pulped with water to prepare it for wet-magnetic purification.

The roasted product may be lixiviated with water without a magnetic purification treatment in order to remove some or all of the barium chloride.

As an alternative, the water-leaching step may be omitted and the hydrochloric acid extraction used to remove barium chloride as well as other impurities (e.g., calcium sulfide, aluminum and iron contained in clay gangue, iron coating the surfaces of the fluorite and barite particles, and calcium phosphate minerals such as apatite.)

Excellent results have been realized with dilute hydrochloric acid at elevated temperature.

It is possible to leach the residue obtained from the hydrochloric acid extraction with an alkaline leach using, for example, sodium carbonate solution at elevated temperature, e.g., 180° F. The alkaline leach removes silica.

The fluorite may be further purified by extraction with a hydrosulfurous compound in acid media. This results in iron removal and, unexpectedly, it also removes considerable quantities of residual oxides of phosphorous.

Features of the invention will be more fully understood and appreciated from the following illustrative examples.

EXAMPLE

The fluorite ore used in the test was mined in central Italy (Pianciano deposit). The fluorite in the ore was 93 percent by weight finer than 3 microns. The minus 3 micron fluorite particles were highly contaminated with minute inclusions of impurities, principally barite. Other fine impurities included clay, a phosphate mineral (apatite or fluorapatite), iron and calcium carbonate. Attempts to separate the fluorite and barite by froth flotation were unsuccessful. Prior to the present invention, the highest grade products that were produced from the ore contained less than 80 percent $CaF_2$.

The ore was crushed to minus 10 mesh and pugged with water at 65 percent solids for 2 hours. The pugged ore was diluted with water to 15 percent solids and the resulting ore slurry was dispersed by adding soda ash in amount of 12 lbs./ton per ton of solids in the slurry and 4 lbs./ton tetrasodium pyrophosphate. The dispersed slurry was degritted by passing it through a 325 mesh (Tyler) screen. The minus 325 mesh dispersion was fractionated and a minus 3 micron fraction was recovered for further processing.

The products were weighed and analyzed chemically. From these values, the distribution of minerals in the products were calculated. Results are summarized in Table I along with assays of the starting ore ("heads").

Data in Table I show that a low grade fluorite concentrate (80.3 percent $CaF_2$) was obtained at a 92.9 percent recovery by pugging the ore, fractionating at minus 3 microns and recovering the minus 3 micron fraction. The low grade fluorite concentrate contained 78.8 percent by weight of the heads and was enriched in $P_2O_5$ and silica as well as the desired fluorite. The barium sulfate content of the low grade fluorite concentrate was 5.4 percent.

Data in Table II show that by means of a chloridizing roast and acid extraction at 90.8 percent grade fluorite concentrate was obtained at a 71.1 percent recovery from a low grade fluorite concentrate obtained by hydraulic classification of the ore. The 90.8 percent grade concentrate contained less than 0.1 percent barite and 0.92 percent $P_2O_5$. The concentrate was further upgraded to 93.2 percent $CaF_2$ by treatment with a hydrosulfurous compound which reduced the iron content and unexpectedly eliminated almost half of the residual $P_2O_5$ from the fluorite.

TABLE II

Metallurgical results—concentration of $CaF_2$ from finely mineralized fluorspar ore by hydrometallurgy-pyrometallurgy

| Products | Weight, percent | Assays, wt, percent | | | |
|---|---|---|---|---|---|
| | | $CaF_2$ | $SiO_2$ | $P_2O_5$ | $BaSO_4$ |
| (1) Minus 3 micron concentrate | 100.0 | 78.0 | 1.3 | 2.58 | 5.0 |
| (2) (1) After roasting and HCl leach | *71.1 | 90.8 | *1.7 | 0.92 | <0.1 |
| (3) (2) After treatment with $SO_2$ and $Na_2S_2O_4$ | 67.7 | 93.2 | | 0.46 | <0.1 |

*=Values indicate that silica tray was attacked during roasting.

TABLE I

[Compositions of fractions of pugged Italian fluorspar ore]

| Products | Weight, percent | Chemical analysis, wt. percent | | | | Distribution, wt. percent | | | |
|---|---|---|---|---|---|---|---|---|---|
| | | $CaF_2$ | $BaSO_4$ | $P_2O_5$ | $SiO_2$ | $CaF_2$ | $BaSO_4$ | $P_2O_5$ | $SiO_2$ |
| +325 mesh | 8.0 | 19.3 | 54.3 | 1.5 | 4.3 | 2.3 | 27.7 | 5.3 | 17.7 |
| −325 mesh+3μ | 13.2 | 24.8 | 54.0 | 2.1 | 2.6 | 4.8 | 45.4 | 12.1 | 17.6 |
| −3μ* | 78.8 | 80.3 | 5.4 | 2.4 | 1.6 | 92.9 | 26.9 | 82.6 | 64.7 |
| Heads | 100.0 | 64.0 | 18.1 | 2.1 | 2.0 | 100.0 | 100.0 | 100.0 | 100.0 |

*=−3μ fraction also analyzed: 1.2% $CaCO_3$; 0.08% Mn; 1.0% $Fe_2O_3$.

The low grade fluorite concentrate was dried and given a chloridizing roast by mixing 100 g. of sample with 2.5 g. carbon and 5.7 g. $CaCl_2$ anhydrous and roasting the mixture in a silica tray for 60 minutes at 1,093° C. The tray was loosely covered with another silica tray during roasting.

The roasted product was cooled to room temperature and diluted with water. Concentrated hydrochloric acid (16 molar) was added in amount of 14.0 g. The pulp at 15 percent solids was agitated for 60 minutes at 190° F. The slurry was filtered, washed with water and dried.

The dried solids were slurried with water and sulfur dioxide was passed into the slurry until the pH was 1.5. Sodium hydrosulfite ($Na_2S_2O_4$) was then added in amount of 1.5 g. and the slurry was agitated for 10 minutes. The slurry was filtered, washed and dried.

Analysis of the products at various stages of the process are summarized in Table II.

I claim:

1. A method for recovering calcium fluoride from an ore containing barite gangue in which the bulk of the calcium fluoride particles are finer than 10 microns and contain inclusions of impurities including barite which comprises:
    pugging the ore,
    forming the pugged ore into an aqueous pulp,
    dispersing the pulp,
    subjecting the dispersed pulp to fractionation,
    recovering a fine size fluorite-enriched fraction of the pulp containing particles substantially all of which are finer than 10 microns,
    mixing the fine size fraction with sufficient calcium chloride and sufficient carbon to convert the barite to barium chloride
    roasting the mixture at a temperature within the range of 760° to 1,100° C.,
    lixiviating the roasted product with water,
    and extracting the lixiviated product with hydrochloric acid.

2. The method of claim 1 including the step of extracting residual impurities from the acid-extracted product with a hydrosulfurous compound.

3. The method of claim 1 including the step of removing iron from the roasted product by wet-magnetic treatment before extracting it with hydrochloric acid.

4. In a method for recovering calcium fluoride from finely divided fluorspar ore containing barite in the gangue, the steps for removing the barite from the ore which comprise: roasting said ore at a temperature within the range of 760° to 1,100° C. in the presence of added carbon and a chloride salt which contains a cation which, during the roasting, forms a sulfide salt which is soluble in hydrochloric acid, said carbon and said chloride salt being added in amount sufficient to convert said barite to barium chloride and an acid soluble sulfide, lixiviating the roasted ore with water and extracting the lixiviated product with hydrochloric acid.

5. The method of claim 4 wherein said chloride salt is calcium chloride.

* * * * *